US012617063B2

(12) United States Patent
Kraft

(10) Patent No.: US 12,617,063 B2
(45) Date of Patent: May 5, 2026

(54) SHEET METAL HAMMER WITH DRIVE MANIPULATION FEATURE

(71) Applicant: OCD INNOVATIONS, LLC, Miami, FL (US)

(72) Inventor: Robert Kraft, Miami, FL (US)

(73) Assignee: OCD INNOVATIONS, LLC, Miami, FL (US)

( * ) Notice: Subject to any disclaimer, the term of this patent is extended or adjusted under 35 U.S.C. 154(b) by 0 days.

(21) Appl. No.: 18/609,355

(22) Filed: Mar. 19, 2024

(65) Prior Publication Data

US 2024/0326210 A1 Oct. 3, 2024

Related U.S. Application Data

(60) Provisional application No. 63/493,232, filed on Mar. 30, 2023.

(51) Int. Cl.
*B25D 1/00* (2006.01)
*B21D 39/02* (2006.01)

(52) U.S. Cl.
CPC ............. *B25D 1/00* (2013.01); *B21D 39/025* (2013.01)

(58) Field of Classification Search
CPC ... B25D 1/00; B25D 1/02; B25D 1/04; B25D 1/045; B25D 1/08; B25D 1/10; B25D 1/12; B25D 1/16; B25F 1/00; B25F 1/006; B25F 1/02; B25G 1/08; B21D 39/025
USPC ............................................................... 81/20
See application file for complete search history.

(56) References Cited

U.S. PATENT DOCUMENTS

| | | | | |
|---|---|---|---|---|
| 292,168 A * | 1/1884 | Lytle | B25B 13/48 | 7/138 |
| 2,491,129 A * | 12/1949 | Nieuwsma | B25D 1/04 | 254/26 R |
| 2,609,962 A * | 9/1952 | Schultz | B67B 7/40 | 7/153 |
| 2,960,133 A | 11/1960 | Shepherd, Jr. | | |
| 3,712,284 A | 1/1973 | Porter | | |

(Continued)

FOREIGN PATENT DOCUMENTS

| | | |
|---|---|---|
| CN | 112936190 A * | 6/2021 |
| CN | 308264154 S | 10/2023 |
| JP | 3144260 U * | 8/2008 |

OTHER PUBLICATIONS

Midwest Tool & Cutlery Co., "18-Ounce Sheet Metal Hammer with Cleat Slot [MWT-18]", USA, https://midwestsnips.com/product/midwest-18-ounce-sheet-metal-hammer-with-cleat-slot/.

*Primary Examiner* — Brian D Keller
*Assistant Examiner* — Aaron R McConnell
(74) *Attorney, Agent, or Firm* — Jacob M. Ward; Ward Law Office LLC

(57) ABSTRACT

An ergonomic sheet metal hammer is disclosed, featuring a multifunctional design that enhances usability and efficiency in sheet metal work. The hammer includes a built-in drive slot for precise bending of sheet metal drives, an ergonomically configured handle to reduce fatigue, and a handle with a removable cap for storage. Additionally, the hammer head incorporates a 1"×1" measurement for quick reference and is marked with various measurement indicia for versatility in use. The invention aims to provide a comprehensive tool for sheet metal workers, combining functionality for bending, measuring, and marking in a single, ergonomically optimized device.

20 Claims, 11 Drawing Sheets

(56) References Cited

U.S. PATENT DOCUMENTS

| | | | | |
|---|---|---|---|---|
| 4,028,757 | A * | 6/1977 | Young | B25D 1/04 254/26 R |
| D269,061 | S * | 5/1983 | Peterson | D8/79 |
| D318,998 | S | 8/1991 | Osborne | |
| 5,315,724 | A * | 5/1994 | Trujillo | B25F 1/00 7/161 |
| 6,339,974 | B1 | 1/2002 | Kotschner et al. | |
| D478,265 | S | 8/2003 | Chen | |
| D522,340 | S | 6/2006 | Hung | |
| D600,523 | S | 9/2009 | Adams et al. | |
| D601,397 | S | 10/2009 | Johnsen | |
| D601,398 | S | 10/2009 | Youngren et al. | |
| D604,136 | S | 11/2009 | Youngren et al. | |
| D672,218 | S | 12/2012 | Youngren et al. | |
| D677,550 | S | 3/2013 | Bauer-Juarez | |
| D769,097 | S | 10/2016 | Welsh | |
| 9,533,178 | B2 * | 1/2017 | Kao | B25F 1/006 |
| D809,891 | S | 2/2018 | Bullard | |
| 10,066,432 | B2 * | 9/2018 | Sanchez | E05F 9/00 |
| D845,736 | S | 4/2019 | Chen | |
| 10,427,286 | B2 * | 10/2019 | McCann | B26B 23/00 |
| 10,682,749 | B2 | 6/2020 | Rittenhouse | |
| 2007/0124867 | A1 * | 6/2007 | Woods | B25F 1/00 7/164 |
| 2007/0226913 | A1 * | 10/2007 | Woolley | E04G 23/082 81/46 |
| 2011/0088170 | A1 * | 4/2011 | Crookston | B25D 1/06 7/122 |
| 2012/0091409 | A1 * | 4/2012 | Hanlon | B25D 1/12 81/22 |
| 2012/0098282 | A1 * | 4/2012 | Langan | B25G 3/30 7/167 |
| 2018/0079060 | A1 | 3/2018 | Manning | |
| 2018/0304338 | A1 * | 10/2018 | Tim | B21D 39/025 |
| 2018/0304452 | A1 * | 10/2018 | Rittenhouse | B25F 1/006 |
| 2020/0246955 | A1 * | 8/2020 | Zitlau | B25D 1/04 |
| 2021/0323138 | A1 * | 10/2021 | Villarino, III | B25D 1/02 |

* cited by examiner

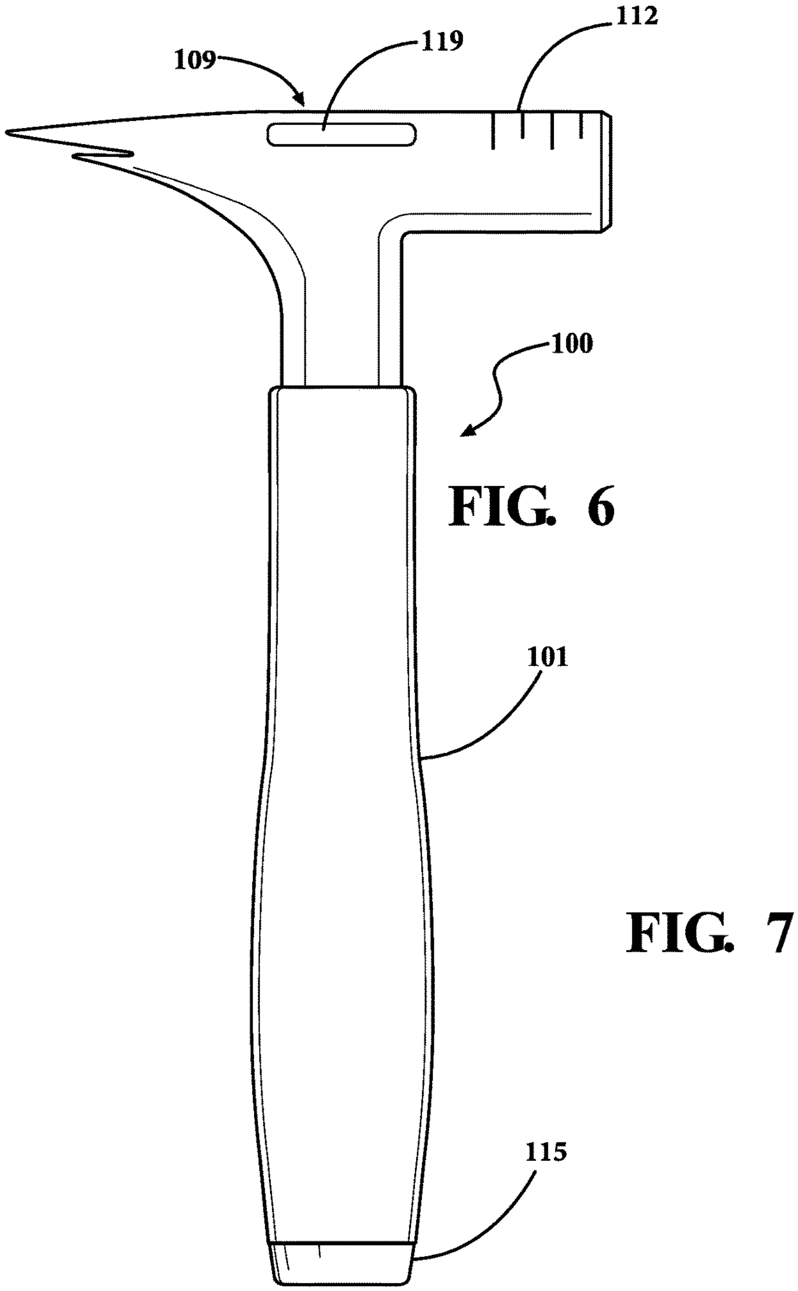
FIG. 6
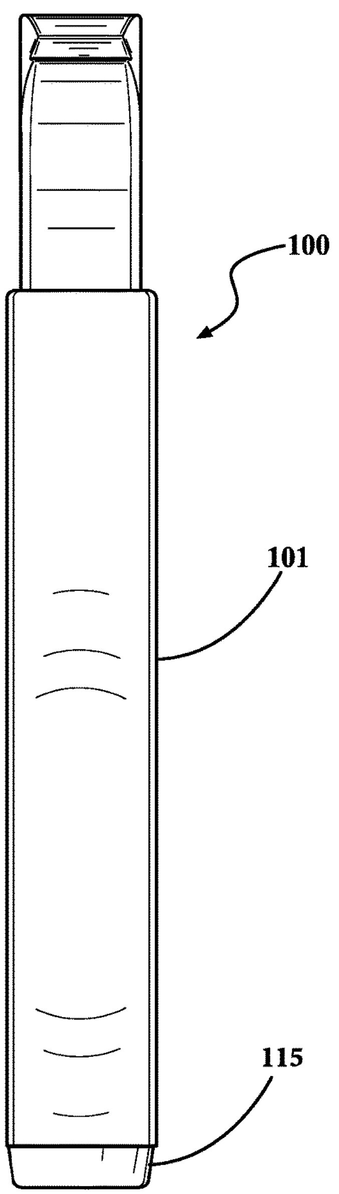
FIG. 7
FIG. 8
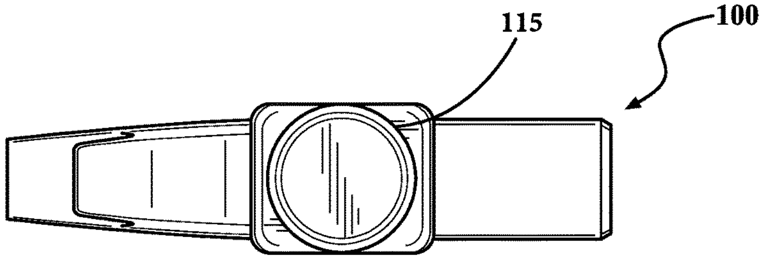

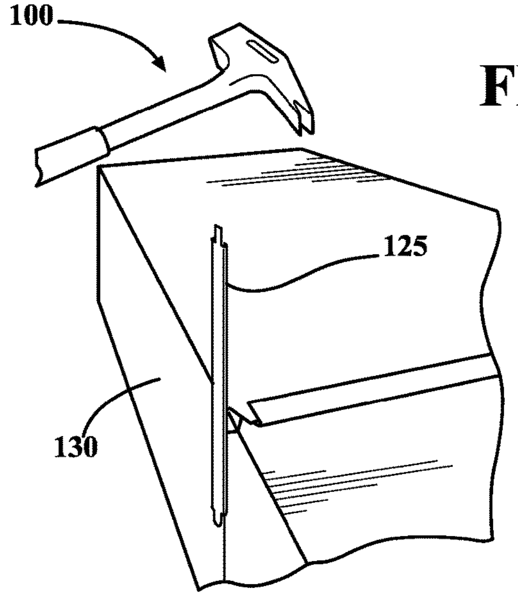
FIG. 13
FIG. 14
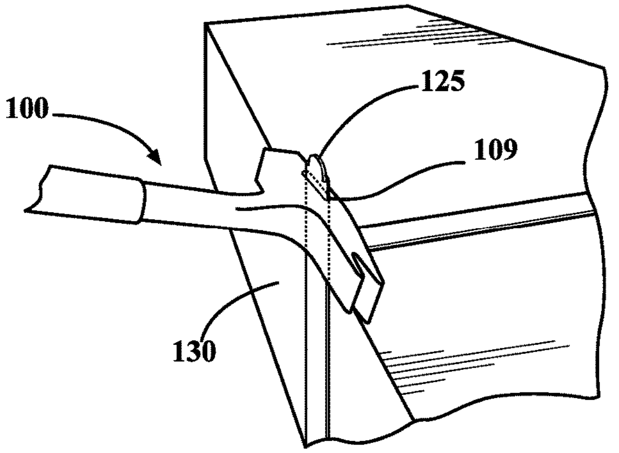
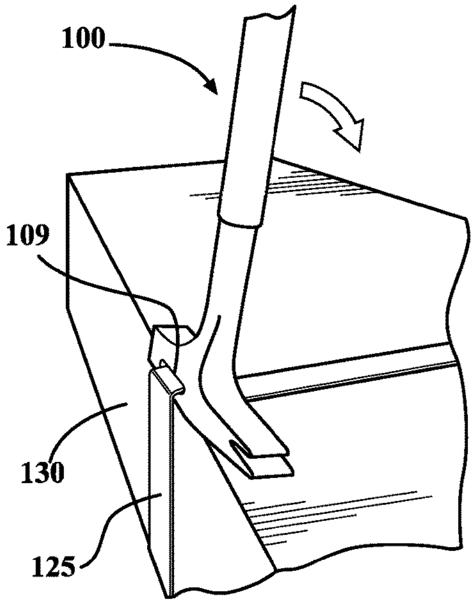
FIG. 15
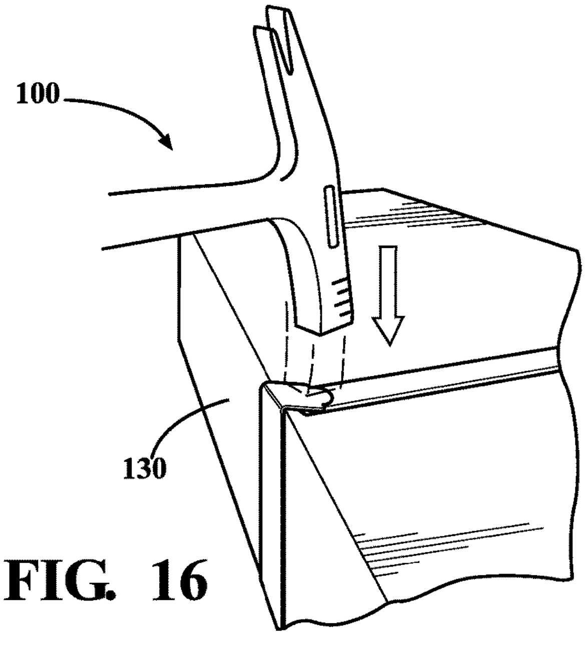
FIG. 16

SHEET METAL HAMMER WITH DRIVE MANIPULATION FEATURE

CROSS-REFERENCE TO RELATED APPLICATIONS

This application claims the benefit of U.S. Provisional Application No. 63/493,232, filed on Mar. 30, 2023. The entire disclosure of the above application is incorporated herein by reference.

FIELD

The present technology relates to hand tools designed for sheet metal work and, more specifically, to a sheet metal hammer that integrates multiple functions including bending, measuring, and marking capabilities.

INTRODUCTION

This section provides background information related to the present disclosure which is not necessarily prior art.

Various types of sheet metal work may be performed in various industries, including construction and automotive applications, as well as heating, ventilation, and air conditioning (HVAC) applications. Workers in these fields may frequently engage in tasks that require the manipulation of sheet metal, such as bending, cutting, and shaping to meet specific design requirements. Traditional tools used in sheet metal work, while effective for an intended purpose, may fall short in providing the versatility and efficiency needed to address a full spectrum of tasks encountered by professionals in these industries.

A challenge in sheet metal work may be the bending of sheet metal drives. Sheet metal hammers may be designed primarily for striking and shaping metal surfaces but lack specialized features for precisely bending sheet metal drives. This limitation necessitates the use of additional tools, such as hand seamers or pliers, to achieve desired bends. The need to switch between multiple tools may slow down the workflow and increase the risk of inaccuracies and inconsistencies in the work produced. A sheet metal hammer may also not have the capability to bend a drive or make a common measurement used in the sheet metal industry. The sheet metal hammer may also not open drives, and typically does not have a comfortable handle and thus may cause fatigue after prolonged use.

Accordingly, there is a need for a sheet metal hammer that has the capability to bend a drive, make a common measurement, open drives, and have a comfortable handle that does not cause fatigue after using for a period of time.

SUMMARY

In concordance with the instant disclosure, a sheet metal hammer that has the capability to bend a drive, make a common measurement, open drives, and have a comfortable handle that does not cause fatigue after using for a period of time, has surprisingly been discovered.

The present technology includes articles of manufacture, systems, and processes that relate to a multifunctional sheet metal hammer configured to improve efficiency and precision in sheet metal work. This tool may integrate features such as a drive manipulation feature or slot, an ergonomic grip, a writing implement holder, and measurement indicia, to facilitate a wide range of tasks including bending drives, making measurements, and marking work materials.

In certain embodiments, a sheet metal hammer is provided that includes a handle and a head attached to the handle. The head may include drive manipulation feature configured to bend a sheet metal drive. The drive manipulation feature may include a slot integrated into the head. The slot may pass entirely through the head. The slot may be disposed orthogonal to the handle.

In certain embodiments, a sheet metal hammer may include a handle, a drive opener, and a head attached to the handle. The drive opener may be configured to open a sheet metal drive. The head may have a drive manipulation feature configured to bend the sheet metal drive. The drive manipulation feature may include an elongate slot integrated into the head, where the elongate slot may be dimensioned to accommodate a range of predetermined sheet metal drive widths. The drive manipulation feature may include the slot integrated into a top of the head. The slot may pass entirely through the head, and further wherein the slot is disposed orthogonal to the handle. Measurement indicia on the head of the sheet metal hammer may include various linear measurements, such as ⅛", ¼", ½", ¾", and 1". The head may be dimensioned 1"×1". An ergonomically configured handle may include ridges and be contoured for ergonomic comfort. A writing element may be removably disposed within the handle. An integrated magnet may be configured to couple the sheet metal hammer to a magnetically attractable surface.

In certain embodiments, a method of using a sheet metal hammer to bend a drive for ductwork is provided. The method may include providing the sheet metal hammer with a handle and a head attached to the handle, the head having a drive manipulation feature. The drive manipulation feature may include a slot integrated into a top of the head. The slot may pass entirely through the head. The slot may be disposed orthogonal to the handle. A sheet metal drive may be inserted into a slot of the head, and then bent by applying a force to one side of the drive. This method may simplify the process of bending drives for ductwork, making it more efficient and accessible.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6 is a second side elevation view of the sheet metal hammer from FIG. 2.

FIG. 7 is a back side elevation view of the sheet metal hammer from FIG. 2.

FIG. 8 is a bottom plan view of the sheet metal hammer from FIG. 2.

Figure 2:
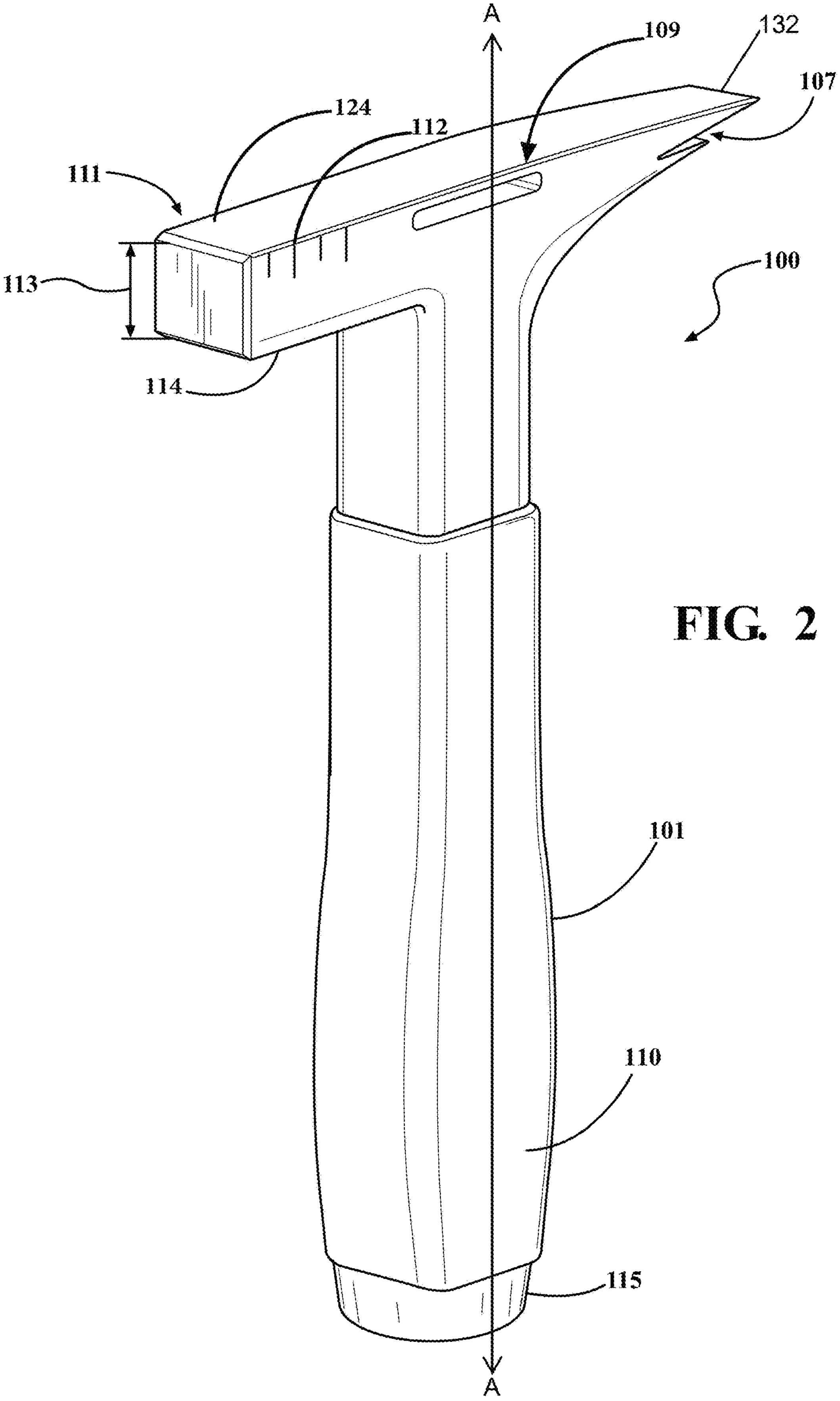
FIG. 2 is a top front perspective view of a sheet metal hammer, according to an embodiment of the present disclosure.

FIGS. 13-16 show the sheet metal hammer from FIG. 2, including ways of operating the sheet metal hammer, including providing a sheet metal drive, placing the sheet metal drive onto ductwork, engaging the sheet metal drive with the drive manipulation feature of the sheet metal hammer, and bending the sheet metal drive by applying a force to the sheet metal drive using the drive manipulation feature of the sheet metal hammer.

Figure 17:
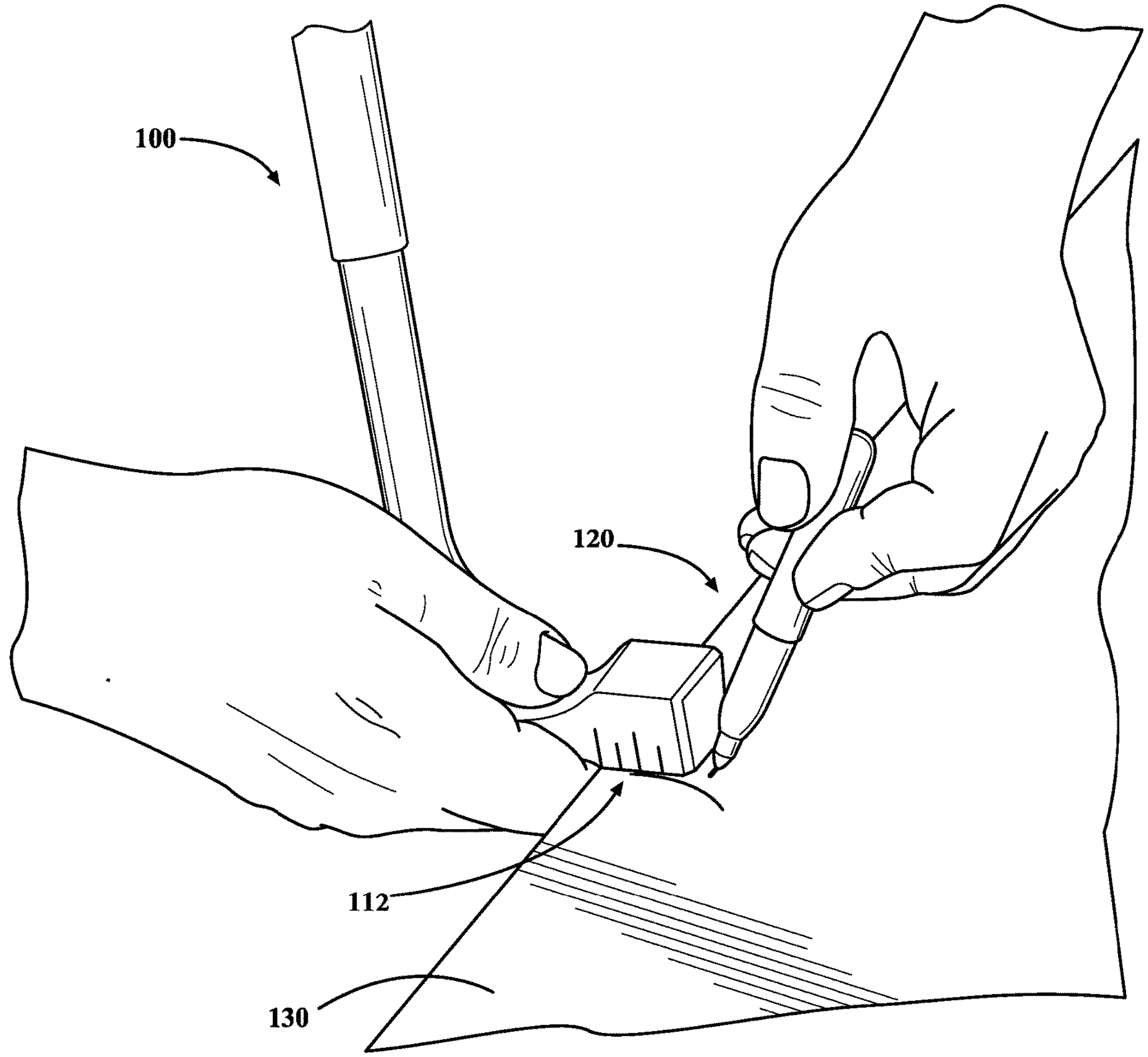
Figure 18:
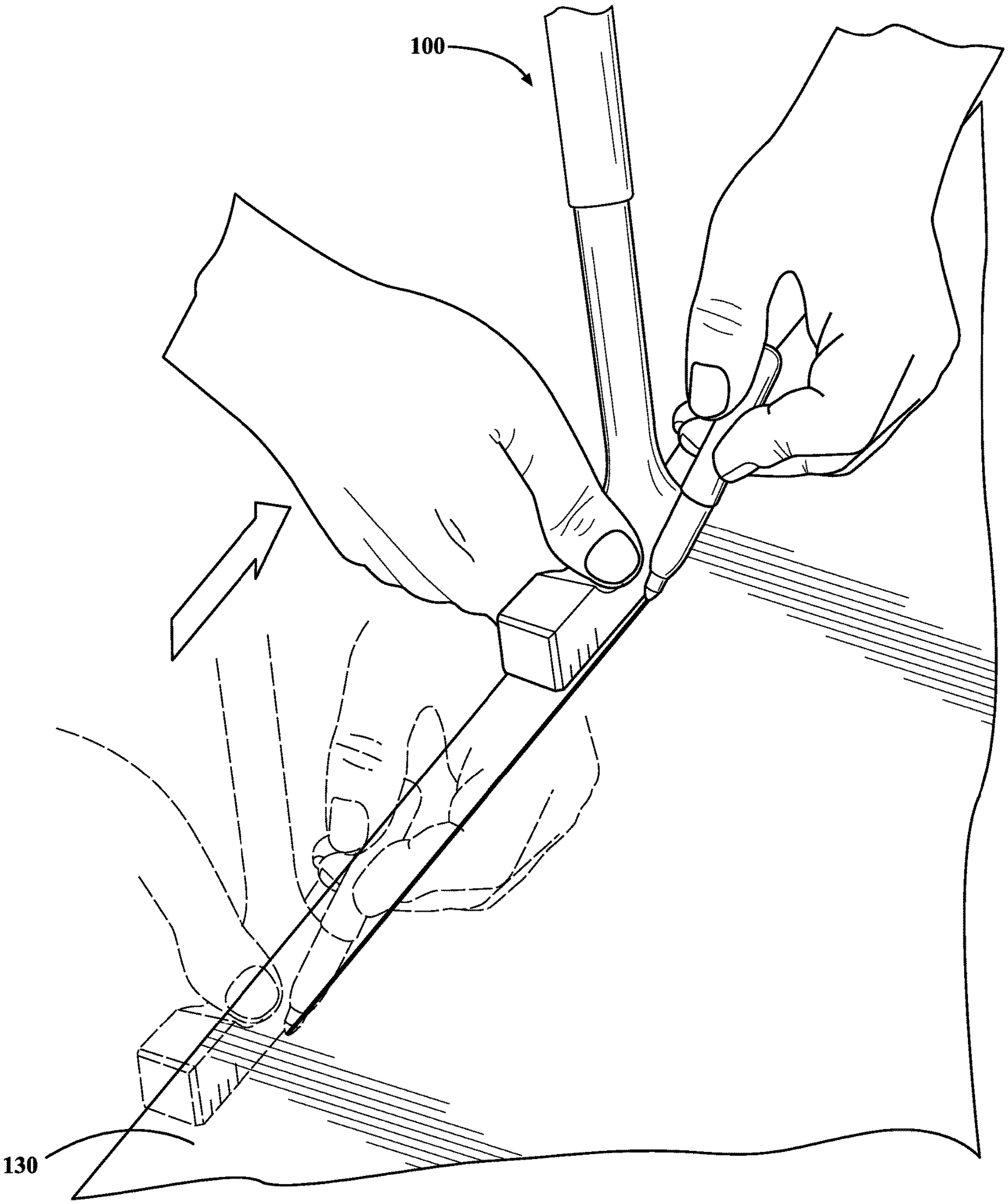

FIGS. 17-18 show the sheet metal hammer from FIG. 2, including ways of operating the sheet metal hammer, including marking ductwork, according to embodiments of the present disclosure.

Figure 19:
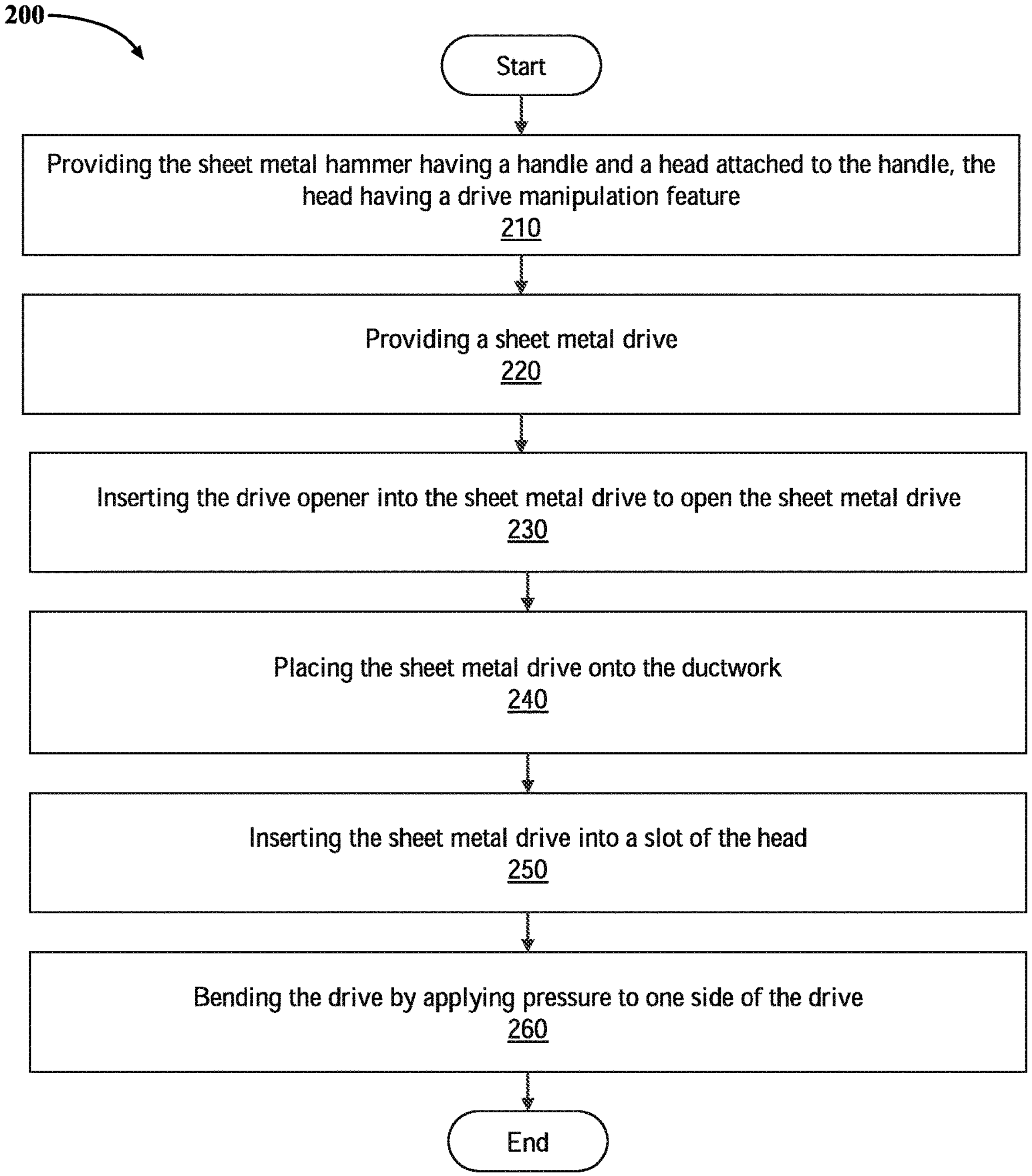

FIG. 19 is a flowchart illustrating a method of using a sheet metal hammer to bend a drive for ductwork, according to an embodiment of the present disclosure.

DETAILED DESCRIPTION

The following description of technology is merely exemplary in nature of the subject matter, manufacture, and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below," or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology relates to a sheet metal hammer and ways of using a sheet metal hammer. The sheet metal hammer has the capability to bend a sheet metal drive by sliding the sheet metal drive into a built-in drive slot and applying a force to one side or the other. The sheet metal hammer may also have an ergonomically configured handle to help reduce fatigue of a user. The sheet metal hammer may include a 1"×1" head configured to make it convenient to make and/or mark common measurements. The head may also incorporate various measurement indicia, including ⅛", ¼", ½", ¾" and 1" measurements so a user may use it for other measurement operations as well. The sheet metal hammer may also have a writing element holder with a removable cap on the base of the hammer.

In certain embodiments, the sheet metal hammer may make it possible to quickly and easily bend sheet metal drives, open sheet metal drives, make common measurements used in sheet metal installation, and provide quick access to a writing implement when needed. The sheet metal hammer may also have a larger flat area on each side to make more accurate blows to sheet-metal without denting the sheet metal. The grip may be made of a soft material that reduces fatigue to a user, where the grip can be configured to be longer than a standard hammer grip so that the grip runs higher up on the hammer handle toward the head, which may be comfortable on user's hands for light tapping when held closer to the head. For example, the grip may cover anywhere from up to two-thirds, three-quarters, or four-fifths of the handle portion of the sheet metal hammer. In certain embodiments, the grip may cover the entirety of the handle portion.

The sheet metal hammer may be capable of bending drives with a square bend utilizing a cut out slot integrated into a top of the hammer head and pry open drives for installation, for example, after a sheet metal drive is cut to a predetermined installation length. The sheet metal hammer may also provide quick access to a writing implement stowed within the handle that may be used to make a measurement mark. In this way, the sheet metal hammer may be used to assemble sheet metal with comfort and added stability in utilizing an ergonomic grip for different types of striking and tapping.

In certain embodiments, the sheet metal hammer may be manufactured from metal, steel, aluminum, various metal alloys, fiberglass, composites, carbon fiber, and combinations thereof. However, as would be apparent to someone of ordinary skill in the art, the sheet metal hammer may be manufactured out of any appropriately desired material and/or combination of materials that can provide the strength and durability necessary for sheet metal installation operations conducted in accordance with the present disclosure. The sheet metal hammer may have an integrated magnet for convenient mounting. The handle may include a grip formed of rubber and/or synthetic materials. In particular, the grip may have ridges or be contoured in a way to make it ergonomically comfortable, such as including finger grooves and/or various texturing. A removable cap on a bottom of the sheet metal hammer may access a hollow interior of the handle that may be used to store a writing implement, where the cap may be threaded on, a push in plug, magnetic, a hinged cap and other appropriately desired ways of securing the removable cap to access the marker.

Measurement marks or indicia integrated on a head of the sheet metal hammer may be etched or printed thereon. In particular, the measurement marks may be located and printed by any appropriately desired process and location on the sheet metal hammer. In certain embodiments, the sheet metal hammer may have the capability to function as a duct stretcher with integrated tabs.

With reference now to the accompanying drawings, including FIGS. 1-19, certain aspects of a sheet metal hammer 100 and uses thereof are shown. The sheet metal hammer 100 may include a handle 101 and a head 111 on one end of the handle 101. The sheet metal hammer 100 may further include a grip 110 on the handle 101 to facilitate holding the sheet metal hammer 100. The head 111 may include a drive opener 107 and a drive manipulation feature 109. The head 111 may be configured to provide a striking surface for the sheet metal hammer 100 to strike an object. In certain embodiments, the head 111 may be configured to strike an object headfirst. Alternatively, the sheet metal hammer 100 and the head may be rotated in a desired orientation to strike an object. With reference to FIG. 10, the sheet metal hammer 100 may include an increased gripping area 103 and an integrated flat portion 105.

The sheet metal hammer 100 may include an integrated magnet 122 configured for conveniently mounting or reversibly coupling the sheet metal hammer 100 with a magnetically attractable surface. The integrated magnet 122 may be located on, within, or partially within an appropriately desired location or portion of the sheet metal hammer 100, thereby allowing the sheet metal hammer 100 to be coupled to a magnetically attractable surface and/or pick up one or more small ferromagnetic objects with the sheet metal hammer 100. In this way, the sheet metal hammer 100 may be retained on the magnetically attractable surface without sliding or falling off and may be used to collect ferromagnetic fasteners, parts, or scraps at various work stages at a job site.

Figure 9:
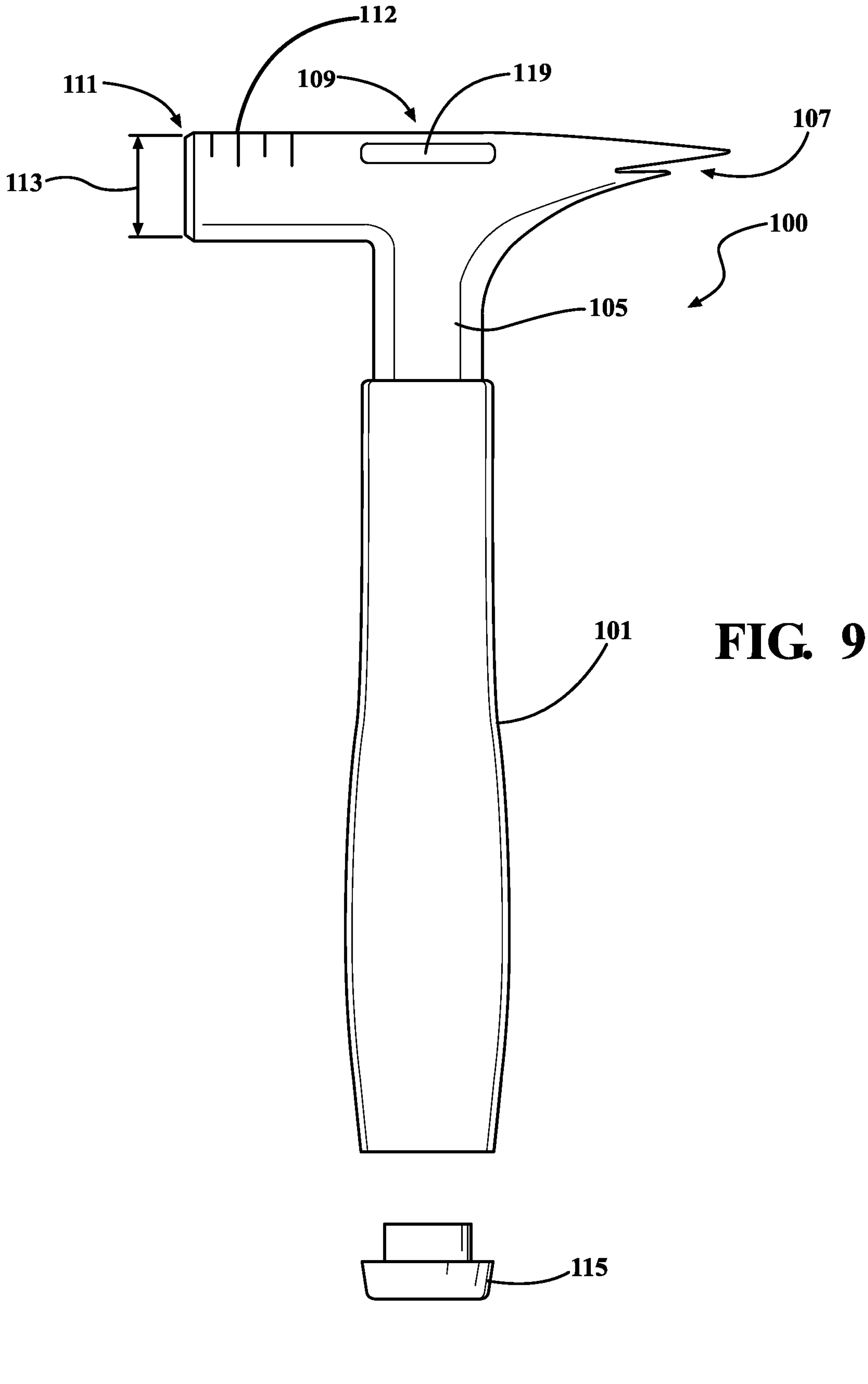
FIG. 9 is a side elevation view of the sheet metal hammer from FIG. 2 with a cap of the handle removed, according to an embodiment of the present disclosure.
Figure 10:
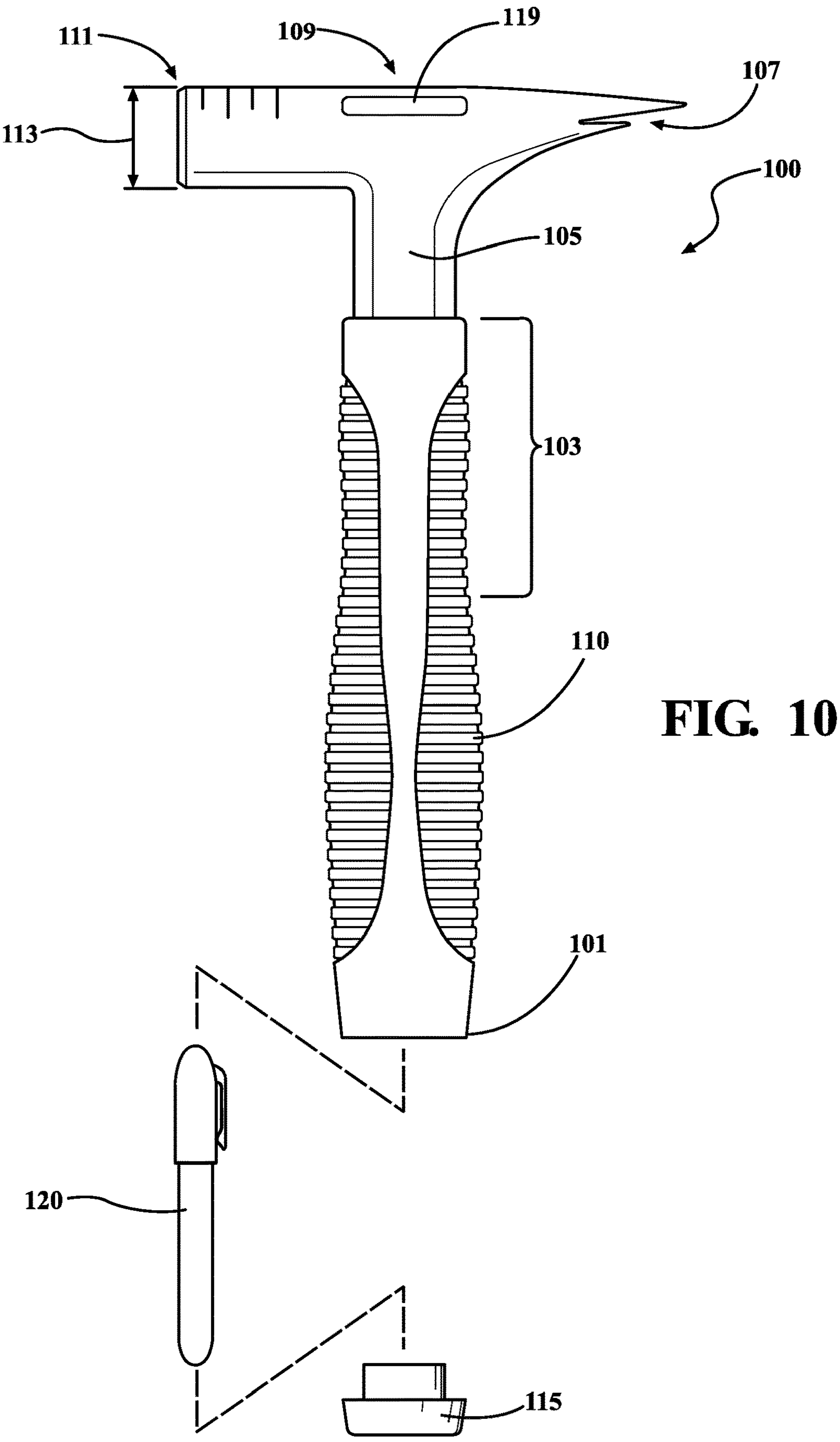
FIG. 10 is a side elevation view of the sheet metal hammer from FIG. 2, showing a removable cap of the handle removed, a writing implement that can be disposed within the handle, and a grip having ridges for gripping a handle of the sheet metal hammer, according to an embodiment of the present disclosure.

As shown in FIGS. 9-10, the handle 101 of the sheet metal hammer 100 may include a removable cap 115, where the handle 101 may be configured to receive a writing implement 120. For example, the handle 101 may include a hollow interior 121 configured to receive a pencil and/or a marker for marking a workpiece, such as ductwork 130 and/or a sheet metal drive 125. The removable cap 115 may include a sealing mechanism to prevent the writing implement 120 from drying out while stored within the handle 101. The handle 101 may be dimensioned to accommodate standard-sized pens or markers, allowing for easy replacement with commercially available writing instruments. In certain embodiments, the handle 101 may include an internal clip or securing mechanism to hold the writing implement 120 during storage and prevent rattling about in the hollow interior 121.

In certain embodiments, the head 111 may include a plurality of measurement indicia 112, such as measurement indicia 112 including ⅛", ¼", ½", ¾" and 1" measurements. An end 113 of the head 111 may have a predetermined dimension, such as 1"×1", as shown in FIGS. 2-3 and 9-10, as another way to make a measurement. As further shown in FIG. 10, the handle 101 may be ergonomically configured with a grip 110 including one or more ridges for gripping the handle 101 and to help reduce fatigue. The sheet metal hammer 100 may also have an integrated flat portion 105 on each side of the sheet metal hammer 100 configured for making more accurate hits to a sheet-metal component, such as a sheet metal drive 125, without damaging the material. The grip 110 may be made of a soft material that reduces fatigue to a user and have a longer grip running higher up on the handle 101 toward the head 111, which may be comfortable on the user's hands for light tapping when the handle 101 is held closer to the head 111 of the sheet metal hammer 100.

Figure 11:
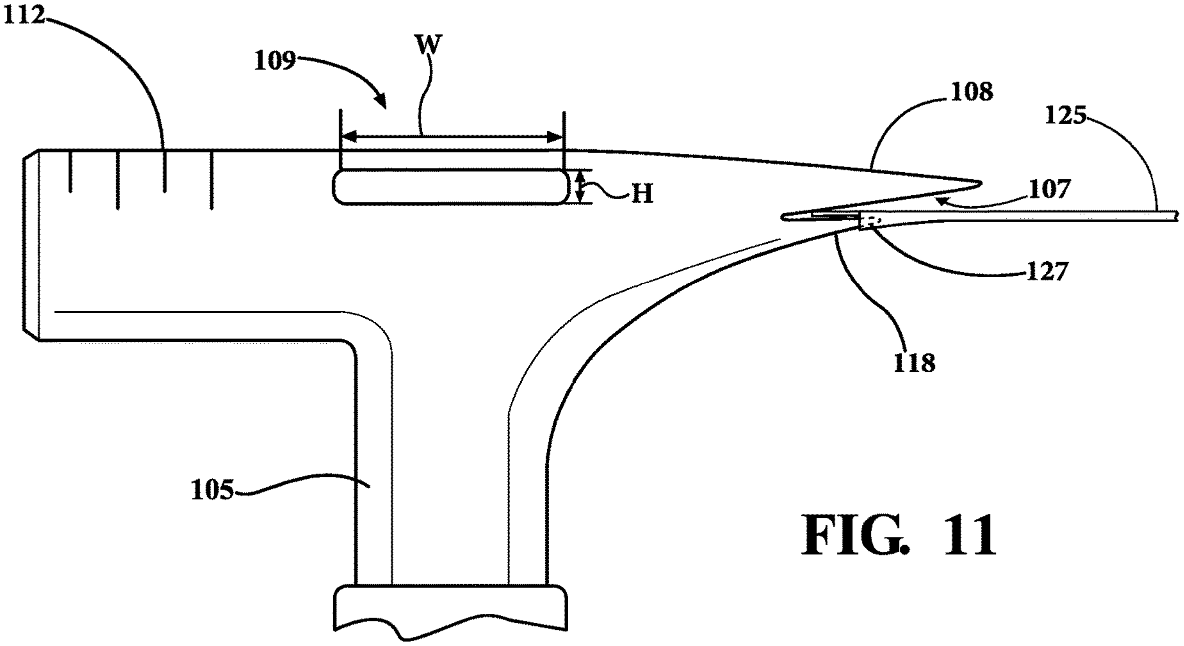
FIGS. 11-12 show the sheet metal hammer from FIG. 2, including further aspects of a drive opener and a drive manipulation feature, including ways of operating a sheet metal hammer, including using the drive opener to open a drive, according to embodiments of the present disclosure.
Figure 12:
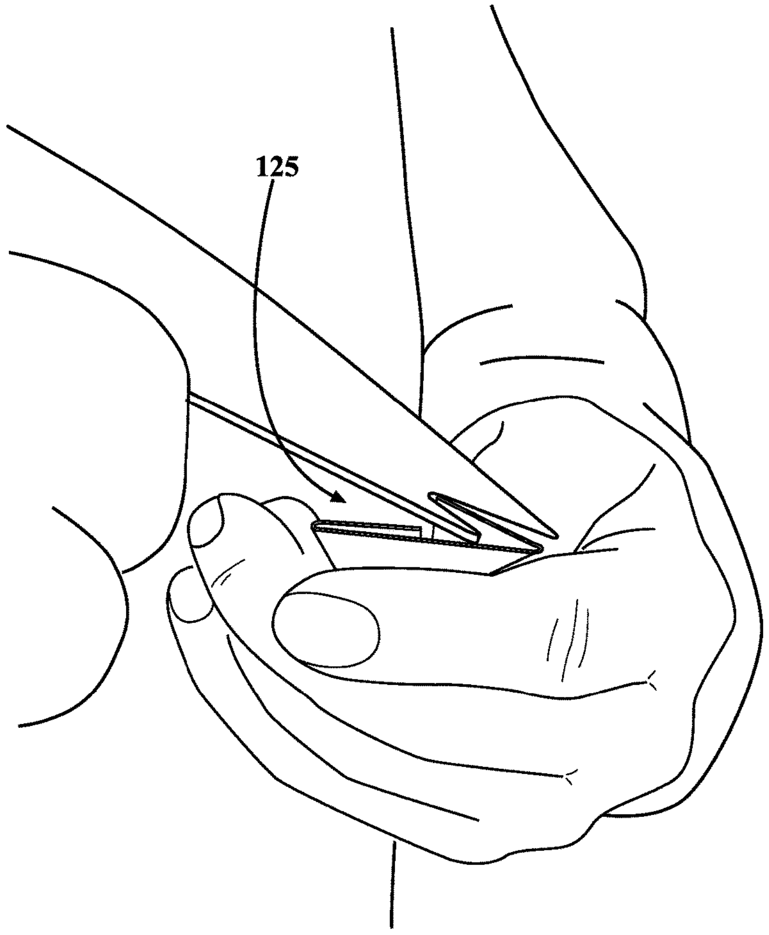

The drive opener 107 may be configured to open a sheet metal drive 125, such as shown in FIGS. 11-12. The drive opener 107 may be located at an appropriately desired location of the sheet metal hammer 100. For example, a bottom surface 114 of the head 111 or an upper surface 124 of the head 111, as shown in FIG. 2. As shown in FIGS. 11 and 12, the drive opener 107 may be configured with a surface for prying open a sheet metal drive 125 after the sheet metal drive 125 has been cut. For example, the drive opener 107 may include an integrated sharp prying tip 127. In particular the design and configuration of the drive opener 107 may be configured for an efficient and a safe opening of a sheet metal drive 125, thus enhancing a utility of the sheet metal hammer 100.

Figure 1:
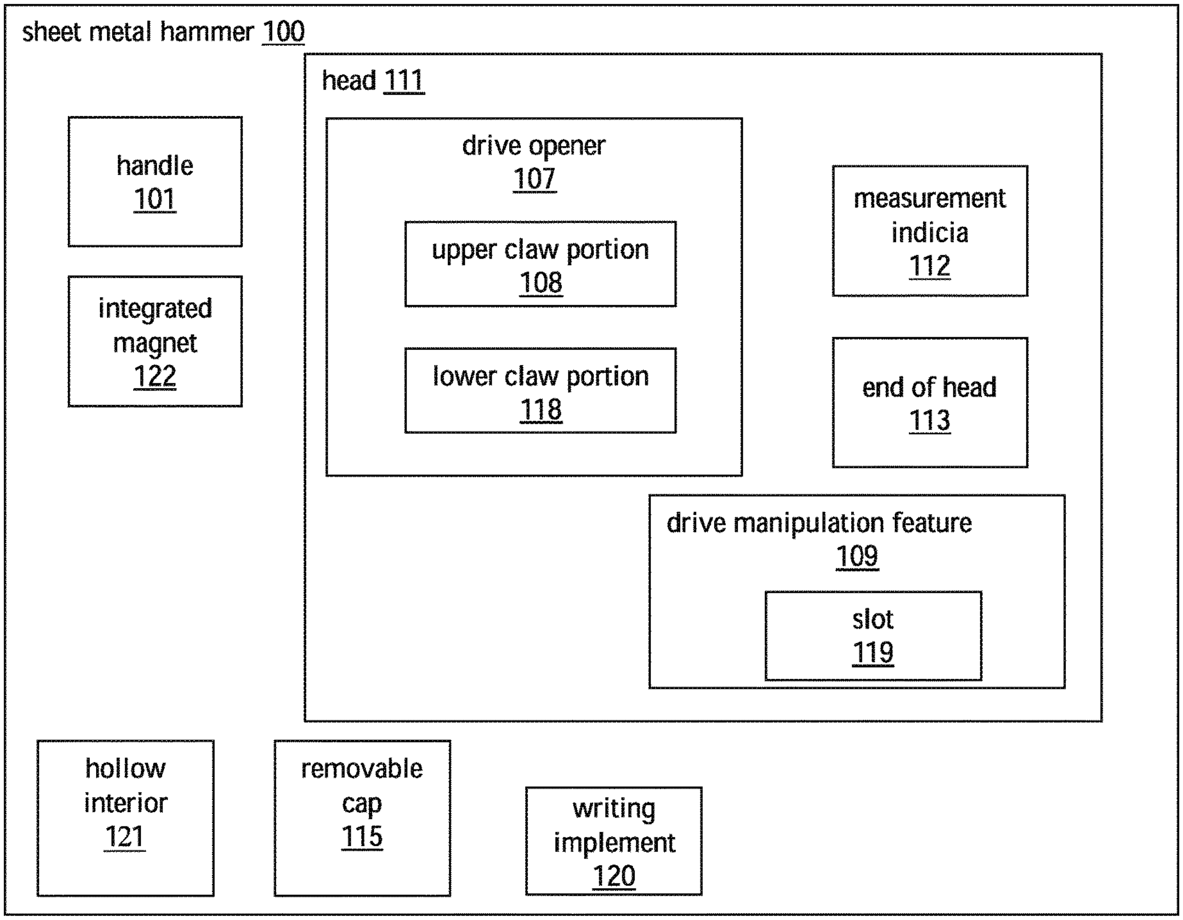
FIG. 1 is a block diagram illustrating aspects of a sheet metal hammer, according to an embodiment of the present disclosure.
Figure 3:
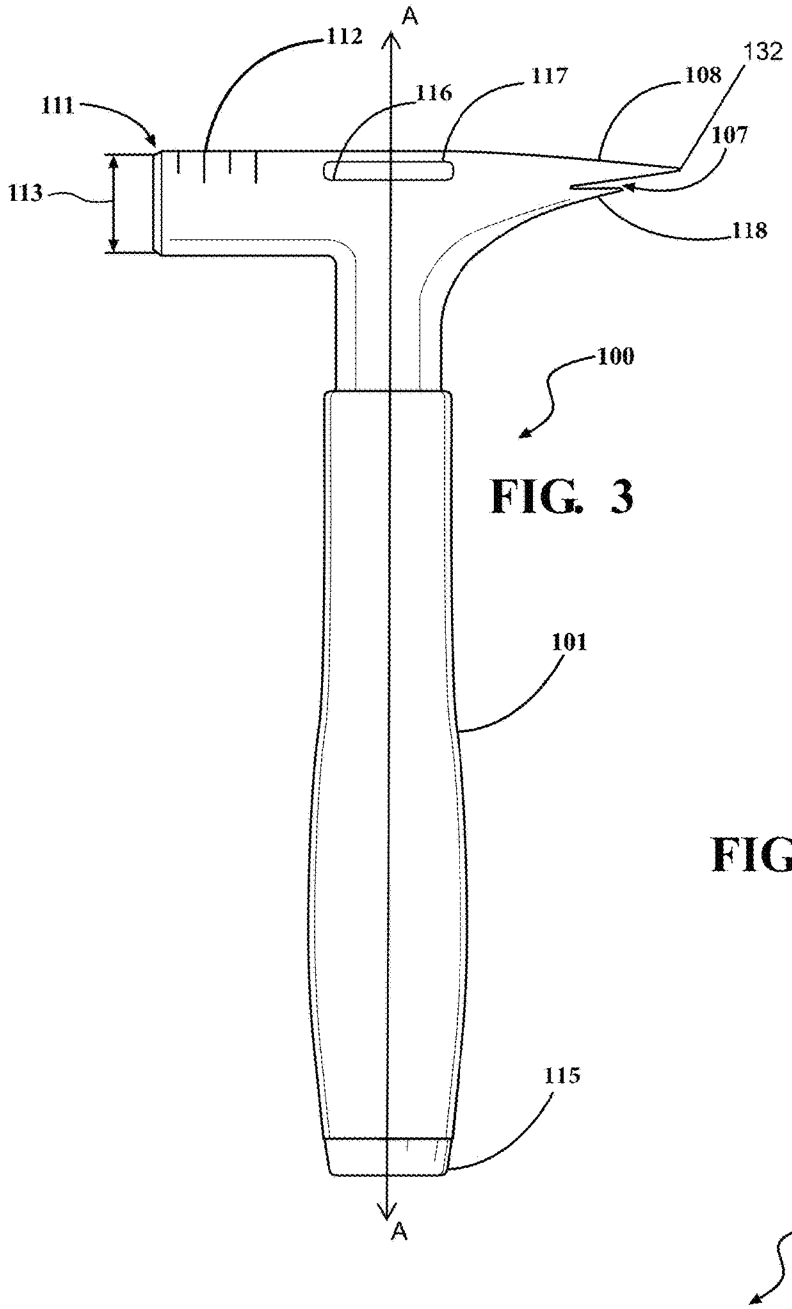
FIG. 3 is a first side elevation view of the sheet metal hammer from FIG. 2.
Figure 4:
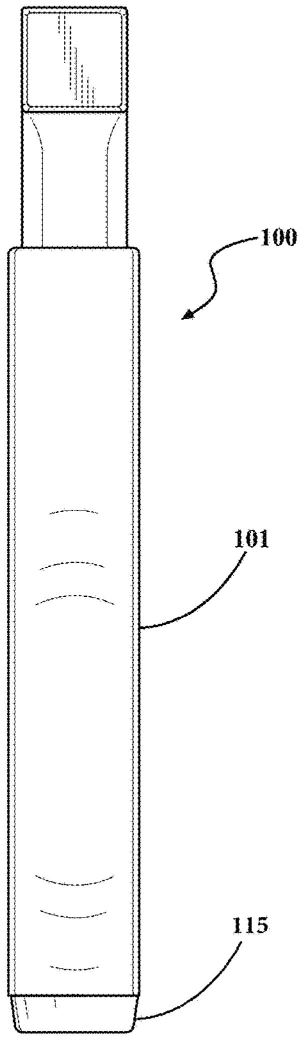
FIG. 4 is a front side elevation view of the sheet metal hammer from FIG. 2.
Figure 5:
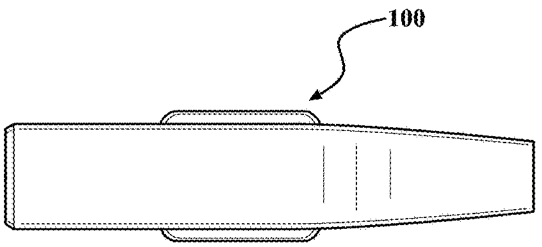
FIG. 5 is a top plan view of the sheet metal hammer from FIG. 2.

The drive opener 107 may be configured to facilitate an opening of the sheet metal drive 125. For example, as shown in FIGS. 1 and 3, the drive opener 107 may include an upper claw portion 108 and a lower claw portion 118, with a notch positioned between the upper claw portion 108 and the lower claw portion 118. The upper claw portion 108 may be positioned above the lower claw portion 118, creating a fixed pincer-like mechanism that may grip and manipulate the sheet metal drive 125. The configuration of the drive opener 107 between the upper claw portion 108 and the lower claw portion 118 may allow a controlled and stable interaction with the sheet metal drive 125.

In certain embodiments of the sheet metal hammer 100, the upper claw portion 108 and the lower claw portion 118 may be different lengths. The variation in length between the upper claw portion 108 and the lower claw portion 118 may be configured to accommodate a range of sheet metal drive 125 sizes and shapes. A longer upper claw portion 108 may support a larger surface area of the sheet metal drive 125, when bending the sheet metal drive 125. A shorter lower claw portion 118 may be configured to apply a force to the drive, to facilitate a clean and precise opening. The differing lengths of the upper claw portion 108 and the lower claw portion 118 may enable a sheet metal drive 125 to be opened without distortion or damage. In particular, as shown within FIG. 12, the upper claw portion 108 may support an outside or backside of the sheet metal drive 125 while the lower claw portion 118 may be used to bend open the sheet metal drive 125. The support of the upper claw portion 108 in conjunction with the lower claw portion 118 may facilitate controlled bending of the sheet metal drive to ensure that the bending force is applied accurately and that the sheet metal drive 125 does not slip or move unexpectedly. The upper claw portion 108 can also prevent bending, curving, or rolling of the portion of the sheet metal drive 125 being engage or lifted by the lower claw portion 118.

As shown in FIGS. 1-11, the head 111 may include the drive manipulation feature 109. The drive manipulation feature 109 may be configured to bend a sheet metal drive 125. In certain embodiments, the drive manipulation feature 109 may include a slot 119 integrated into the head 111 of the sheet metal hammer 100. Where the drive manipulation feature 109 includes the slot 119, the slot 119 may be configured to receive a portion of the sheet metal drive 125 so that a force applied to the sheet metal hammer 100 may be used to bend the portion of the sheet metal drive 125. In certain embodiments, such as shown in FIG. 11, the drive manipulation feature 109 may comprise a dimension of approximately 1⅜" wide (W) and ¼" tall (H). However, the drive manipulation feature 109 may comprise any appropriately desired dimensions for bending the sheet metal drive 125. In particular, the drive manipulation feature 109 may be round, ovoid, square, rectangular, or otherwise comprise an appropriately desired slot 119 or aperture for receiving a correspondingly shaped sheet metal drive 125. Additionally, although, only one slot 119 is shown, the drive manipulation feature 109 may include a plurality of slots 119 of different sizes for receiving and bending a plurality of differently sized sheet metal drives 125.

In certain embodiments, the drive manipulation feature 109 may be located approximately at middle of the head 111 of the sheet metal hammer 100, such as in line with a longitudinal axis of the handle 101. For example, the drive manipulation feature 109 may be located approximately 1/16" from an upper surface 124 of the head 111 of the sheet metal hammer 100. The drive manipulation feature 109 may be configured to fit a variety of sheet metal drive widths, making the tool versatile. In particular, a slot 119 of the drive manipulation feature 109 may be located less than ¼" from the upper surface 124 of the head 111. This positioning may include the drive manipulation feature 109 being less than ⅛", and in certain embodiments, less than 1/16" from the upper surface 124 of the head 111. In this way, the placement of the drive manipulation feature 109 may ensure minimal material distortion during bending of the sheet metal drive 125. The drive manipulation feature 109 may be used to make various bends in a sheet metal drive 125. A square bend relative to the ductwork 130 may enable the coupling of multiple sections of ductwork 130. In certain embodiments, the drive manipulation feature 109 may be used to pre-bend a sheet metal drive 125 and/or create a hanger for mounting the ductwork 130 to an object by bending the sheet metal drive 125 at a predetermined location along one or more locations of the sheet metal drive 125.

In certain embodiments, the slot 119 may slot pass entirely through the head 111 of the sheet metal hammer 100. Configuration of the drive manipulation feature 109 and the slot 119 may be advantageous when working with various widths of sheet metal drives 125, as the slot 119 may adapt to different sizes while maintaining the integrity of the bend. As shown within FIG. 3, the slot 119 may include two opposing parallel sides, which may achieve a predetermined square bend in a sheet metal drive 125. For example, a top side 117 of the slot 119 and a bottom side 116 of the slot 119 may provide a uniform guide for a sheet metal drive 125 as it is inserted into the slot 119 in order to ensure that a bend of the sheet metal drive 125 may be consistent along an entire width of the sheet metal drive 125. The top side 117 of the slot 119 and the bottom side 116 of the slot 119 may be configured such that when force is applied to bend the sheet metal drive 125, the resulting angle may be sufficiently square to the ductwork 130. In particular, in certain embodiments, by leveraging a stability provided by the parallel sides of the slot 119, the sheet metal hammer 100 may allow for a controlled and even application of force, resulting in a 90-degree bend, or other appropriately desired bend angle in the sheet metal drive 125.

As shown within FIGS. 11-12, the drive opener 107 may be used to open a sheet metal drive 125. The sheet metal drive 125, such as a drive cleat may be opened and used to join multiple sections of ductwork 130. The sheet metal drive 125 may be an appropriately desired drive cleat, a S-cleat or other appropriately desired sheet metal drive 125 for joining ductwork 130. The sheet metal drive 125 may be opened using the prying tip 127 disposed on the head 111 of the sheet metal hammer 100 before the sheet metal drive 125 is coupled with ductwork 130. The sheet metal drive 125 may then be coupled with the ductwork 130, after which the sheet metal drive 125 may be inserted into the drive manipulation feature 109 of the sheet metal hammer 100. The drive manipulation feature 109 may then be used to bend the sheet metal drive 125 to an appropriately desired angle relative to the ductwork 130. In particular, the sheet metal drive 125 may be inserted into the slot 119 of the drive manipulation feature 109 and the sheet metal drive 125 may be bent to an appropriate angle by applying a force to one side of the sheet metal drive 125. The sheet metal hammer 100 may then be used to hammer the sheet metal drive 125 level to the ductwork 130 after the sheet metal drive 125 is coupled with the ductwork 130.

With reference to FIGS. 13-16, certain operational steps for using a drive manipulation feature 109 of the sheet metal hammer 100 to bend a sheet metal drive 125 for combining one or more sections of ductwork 130 in accordance with certain embodiments, are depicted therein. The sheet metal hammer 100 may be used to manipulate the sheet metal drive 125 during installation of ductwork 130 to combine sections of ductwork 130.

As shown within FIG. 13, a sheet metal drive 125 may be opened using the drive opener 107, such as described above. The sheet metal hammer 100 may include the drive manipulation feature 109 which includes the slot 119. The slot 119 may be specifically dimensioned, such as described above to accommodate a range of sheet metal drive 125 widths, for different sizes of ductwork 130. The sheet metal hammer 100 may be configured to couple the sheet metal drive with the ductwork 130. For example, as shown within FIG. 13, the sheet metal hammer 100 may be used to hammer or otherwise tap the sheet metal drive 125 to couple edges of the ductwork 130.

As shown within FIG. 14, the sheet metal drive 125 may be inserted into the drive manipulation feature 109. This may ready the sheet metal drive 125 to be bent using the drive manipulation feature 109 by applying a force to a side of the sheet metal drive 125. The sheet metal drive 125 may be aligned with the ductwork 130 to ensure that the bend is at a correct location and bend angle for the assembly of the ductwork 130.

As shown within FIG. 15, after the sheet metal drive 125 is inserted into the drive manipulation feature 109 the sheet metal hammer 100 may be rotated or moved to apply a force to the sheet metal drive 125 to properly bend the sheet metal drive 125 to couple with the ductwork 130 and/or another sheet metal drive 125. In particular, once the sheet metal drive 125 is securely inserted into the drive manipulation feature 109, a force may be applied to a side of the sheet metal drive 125. This force may be applied manually by a user and sufficiently leverage the mechanical advantage of the drive manipulation feature 109 of the sheet metal hammer 100 to create a precise and controlled bend of the sheet metal drive 125. A position of the drive manipulation feature 109 and the slot 119, such as described above, may ensure that the bend of the sheet metal drive 125 may be accurate and consistent with the assembly of the ductwork 130.

As shown within FIG. 16, after the sheet metal drive 125 is bent, the sheet metal hammer 100 may be used to tap or drive the sheet metal drive 125 towards the ductwork to ensure that the sheet metal drive 125 is properly attached with and flush to the ductwork 130 and/or coupled to another sheet metal drive 125. The combination of the drive manipulation feature 109 and the ergonomic design of the sheet metal hammer 100 may enable an efficient and precise bending of a sheet metal drive 125 once coupled with the ductwork 130.

As described above, and as shown in FIGS. 17-18, the head 111 of the sheet metal hammer 100 may include indicia 112. The indicia 112 may be used to mark a location on the ductwork 130. For example, to indicate a desired bend location of the sheet metal drive 125, and/or a location of the sheet metal drive 125. As shown in FIGS. 17-18 the head 111 of the sheet metal hammer 100 may be placed at a desired location and a desired orientation on the ductwork 130 so that a user may use one of the indicia, such as an etched ¼", ½", ¾" and/or 1" marking on the sheet metal hammer 100, to make a quick measurement. The sheet metal hammer may also include an end 113 of the head 111 having a predetermined dimension (e.g., 1"×1") so that a user may turn the sheet metal hammer 100 to the appropriate orientation to use the end 113 of the head 111 having the predetermined dimension as a measurement to make a mark (e.g., 1") when needed. The measurement indicia 112 may be laser-etched onto a surface of the head 111, providing durability and resistance to wear. The measurement indicia 112 may be color-coded, enhancing visibility and ease of use during measurement tasks. In particular, the head may include additional measurement indicia 112 for angles, facilitating bending tasks that require specific angles. The measurement indicia 112 may also include tactile features, such as raised or recessed markings.

FIG. 19 is a flowchart illustrating aspects of a method 200 for using a sheet metal hammer 100, such as described herein and in accordance with certain embodiments of the present disclosure. The method 200 may allow a user to bend a sheet metal drive 125 using the sheet metal hammer 100. For example, at step 210 the sheet metal hammer 100, such as described herein may be provided. At step 220, a sheet metal drive 125 may be provided that matches the requirements of the specific task at hand, ensuring that the sheet metal hammer 100 and material may be compatible for optimal bending performance. At step 230, the drive opener 107 of the sheet metal hammer 100 may be inserted into the sheet metal drive 125 in order to properly bend open the sheet metal drive 125 for coupling with the ductwork 130. This action may be facilitated by the design of the drive opener 107, as described herein. Then, in step 240, the sheet metal drive 125 may be placed onto the ductwork 130 and in the step 250 the sheet metal drive 125 may be placed into the drive manipulation feature 109 (e.g., a slot) of the sheet metal hammer 100 and bent by applying a force to one side of the sheet metal drive 125 in the step 260. This step may leverage the mechanical advantage provided by the design of the head 111 and the drive manipulation feature 109, allowing for precise and controlled bending of the sheet metal drive 125. The sheet metal drive 125 may be correctly positioned on the ductwork before bending, ensuring accurate and effective assembly. In certain embodiments, one or more sheet metal drives 125 may be pre-bent before a sheet metal drive 125 is coupled to the ductwork 130.

Advantageously, the sheet metal hammer 100 and method 200 of using such provide benefits and advantages in the field of sheet metal work, including aspects that address both efficiency and ergonomic needs. The sheet metal hammer 100 integrates several features and associated operations related to preparing and installing sheet metal components into a single tool, streamlining the workflow for technicians, and reducing the need for multiple, separate tools. This integration not only speeds up the process of bending, measuring, and marking sheet metal but also ensures greater precision in these tasks due to the tool's built-in features, such as the drive manipulation feature 109 with its precise slot dimensions and the measurement indicia 112 that may be tailored to predetermined sheet metal install parameters. The ergonomic design of the sheet metal hammer 100, featuring a handle 101 tailored for comfort and reduced fatigue, allows a user to work for extended periods without discomfort, thereby enhancing productivity and reducing the risk of strain-related injuries. This is particularly beneficial in demanding work environments where efficiency and the well-being of the technicians are paramount.

Ways of using the sheet metal hammer 100, including the method 200 provided herein, may include multiple steps for bending a sheet metal drive 125, adjusting on-site, and marking measurements directly on materials, to thereby provide a comprehensive approach to ductwork fabrication, installation, and adjustment. The sheet metal hammer 100 may be used to make on-the-fly modifications without the need for additional tools or returning to the workbench, significantly reducing downtime, and enhancing the overall pace of projects. The present systems and methods offer comprehensive improvements that not only elevate the quality of work but also contribute to a more streamlined, efficient, and ergonomically favorable working environment for professionals in the sheet metal industry.

An example of using the present technology is now made in reference to an HVAC installation project. A ductwork 130 system may be installed within a new commercial building. The project demands precision and efficiency, as the ductwork 130 must fit precisely within the building's framework, and any delays could push back the overall construction timeline.

Fabricating the duct sections may include inserting a sheet metal drive 125 into the elongated slot at the top of the sheet metal hammer 100 and applying a force to one side of the sheet metal drive 125 to create a square bend, which may be essential for fitting the duct pieces together depending on the desired configuration or job site plans. This process may not only speed up the fabrication of the ductwork but also may ensure a higher level of precision. Built-in measurement indicia 112 on the sheet metal hammer 100 allow for quick verification of bend angles and lengths without the user having to reach for a separate measuring tool. The ergonomic design of the handle 101 and the strategically placed grip 110 ridges reduce fatigue, allowing the user to work longer and more comfortably.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

With reference to FIGS. 2-3, the slot 119 can be disposed within a longitudinal axis (A) of the handle 101 and entirely within the head 111. The drive opener 107 can include a drive opener edge 132. The drive opener edge 132 can run along a direction perpendicular to the longitudinal axis (A) of the handle 101.

What is claimed is:

1. A method of using a sheet metal hammer to bend a sheet metal drive for ductwork, the method comprising steps of:

providing the sheet metal hammer having a handle and a head attached to the handle, the head including a drive manipulation feature configured to bend a sheet metal drive, the drive manipulation feature including a slot integrated into the head, the slot passing entirely through the head and disposed orthogonal to the handle, wherein the slot includes an upper surface and a lower surface, the upper surface disposed parallel to the lower surface, and the upper surface and the lower surface are two opposing parallel sides of equal length configured to provide a uniform guide for the sheet metal drive to ensure a consistent bend along an entire width of the sheet metal, a drive opener including a drive opener edge that runs along a direction perpendicular to a longitudinal axis of the handle, and an integrated striking surface disposed opposite the drive opener, wherein the slot is disposed within the longitudinal axis of the handle and entirely within the head, and a length of the head from where the handle meets the head to the integrated striking surface has a constant cross section;

providing a sheet metal drive;

inserting a portion of the sheet metal drive through the slot of the head perpendicular to the handle for a variable distance; and bending the sheet metal drive using the sheet metal hammer while the portion of the sheet metal drive is disposed through the slot of the head of the sheet metal hammer by applying a force to one side of the sheet metal drive.

2. The method of claim 1, wherein the sheet metal hammer includes a drive opener and the method further comprises steps of:

inserting the drive opener into the sheet metal drive to open the sheet metal drive; and placing the sheet metal drive onto the ductwork, prior to the steps of inserting the sheet metal drive into the slot of the head and bending the sheet metal drive by applying a force to one side of the sheet metal drive.

3. The method of claim 1, wherein the step of bending includes rotating the sheet metal hammer while the sheet metal drive remains disposed through the slot.

4. The method of claim 1, wherein the step of bending creates a bend angle of approximately 90 degrees in the sheet metal drive.

5. The method of claim 1, further including the step of removing the sheet metal drive from the slot after the step of bending.

6. The method of claim 1, further including the step of measuring a desired bend location of the sheet metal drive before the step of inserting.

7. The method of claim 1, further including the step of placing the sheet metal drive onto ductwork before the step of bending.

8. The method of claim 7, wherein the step of placing includes positioning the sheet metal drive to span a joint between two sections of ductwork.

9. The method of claim 1, further including the step of hammering the sheet metal drive against the ductwork using the sheet metal hammer.

10. The method of claim 1, wherein the step of applying the force includes applying the force manually by gripping the handle and leveraging the head against the sheet metal drive.

11. The method of claim 1, wherein the step of inserting includes inserting the sheet metal drive through the slot from a first side and extending to a second opposite side of the head.

12. The method of claim 1, further including the step of repeating the steps of inserting and bending for a plurality of different locations along the sheet metal drive to create multiple bends.

13. The method of claim 1, wherein the step of providing includes providing a plurality of sheet metal drives of different sizes, and further comprising selecting an appropriately sized sheet metal drive for the ductwork.

14. The method of claim 1, further including the step of securing the bent sheet metal drive to the ductwork using fasteners after the step of bending.

15. A method of using a sheet metal hammer to bend a sheet metal drive for ductwork, the method comprising steps of:

providing the sheet metal hammer having a handle and a head attached to the handle, the head including a drive manipulation feature configured to bend a sheet metal drive, the drive manipulation feature including a slot integrated into the head, the slot passing entirely through the head and disposed orthogonal to the handle;

providing a sheet metal drive;

inserting a portion of the sheet metal drive through the slot of the head perpendicular to the handle for a variable distance; and bending the sheet metal drive using the sheet metal hammer while the portion of the sheet metal drive is disposed through the slot of the head of the sheet metal hammer by applying a force to one side of the sheet metal drive.

16. The method of claim 15, wherein the step of bending includes rotating the sheet metal hammer while the sheet metal drive remains disposed through the slot.

17. The method of claim 15, further including the step of removing the sheet metal drive from the slot after the step of bending.

18. The method of claim 15, wherein the step of applying the force includes applying the force manually by gripping the handle and leveraging the head against the sheet metal drive.

19. The method of claim 15, wherein the step of inserting includes inserting the sheet metal drive through the slot from a first side and extending to a second opposite side of the head.

20. The method of claim 15, further including the step of repeating the steps of inserting and bending for a plurality of different locations along the sheet metal drive to create multiple bends.

* * * * *